United States Patent [19]

Osburn

[11] 4,004,293
[45] Jan. 18, 1977

[54] TAPE PLAYER PREAMPLIFIER CIRCUIT RESPONSIVE TO TAPE SPEED

[75] Inventor: David W. Osburn, Kokomo, Ind.

[73] Assignee: General Motors Corporation, Detroit, Mich.

[22] Filed: Oct. 31, 1975

[21] Appl. No.: 627,503

[52] U.S. Cl. ................................. 360/67; 360/74
[51] Int. Cl.² ...................................... G11B 15/04
[58] Field of Search ................. 360/67, 61, 73, 66, 360/74; 330/1 R, 30 D

[56] References Cited

UNITED STATES PATENTS

| | | | |
|---|---|---|---|
| 3,465,321 | 9/1963 | Reisfeld | 360/67 |
| 3,585,315 | 6/1971 | Shaifer | 360/67 |
| 3,838,452 | 9/1974 | Royce | 360/67 |
| 3,879,674 | 4/1975 | Dragon | 360/67 |
| 3,952,330 | 4/1976 | Rimkus | 360/74 |

FOREIGN PATENTS OR APPLICATIONS

| | | | |
|---|---|---|---|
| 47-49,004 | 3/1968 | Japan | 360/74 |

Primary Examiner—Jay P. Lucas
Attorney, Agent, or Firm—T. G. Jagodzinski

[57] ABSTRACT

A preamplifier circuit for a tape player includes a voltage-follower transistor which is operable when turned on to establish the output bias voltage of the preamplifier circuit at substantially a reference voltage. In turn, a voltage divider network develops the reference voltage coincident with energization of the tape transport mechanism. Due to the inertia of the tape transport mechanism, the speed of the tape remains below that necessary for undistorted operation during a start-up time period immediately following energization of the tape transport mechanism. An RC network is responsive to development of the reference voltage to provide a time delay such that the voltage-follower transistor is prevented from turning on until after expiration of the start-up time period. Thus, the output bias voltage of the preamplifier circuit is not established until the tape speed is sufficient to permit undistorted operation.

3 Claims, 2 Drawing Figures

TAPE PLAYER PREAMPLIFIER CIRCUIT RESPONSIVE TO TAPE SPEED

This invention relates to a preamplifier circuit for a tape player, preferably a magnetic tape player.

In a magnetic tape player, a pick-up head is responsive to transport of the tape at a prescribed speed to inductively reproduce a signal magnetically recorded on the tape. This signal is amplified by a preamplifier circuit and applied to some utilization device. For example, in an audio playback system, the output signal of the preamplifier circuit is normally fed through a power amplifier circuit to drive a loudspeaker.

The magnetic tape is driven by a tape transport mechanism characterized by an inertia. On account of this inertia, the speed of the tape cannot change instantaneously. As a result, upon energization of the tape transport mechanism, the tape speed only gradually rises and does not reach the prescribed speed until after the expiration of a start-up time period during which the signal developed by the pick-up head is distorted. Accordingly, it is desirable that the preamplifier circuit be kept turned off during the start-up period to avoid the application of a distorted signal to the utilization device.

In a known type of preamplifier circuit, the desired turn-on delay is provided by an RC feedback network wherein the input bias voltage of the preamplifier circuit is defined across a capacitor connected with the pick-up head. Once the tape transport mechanism is energized, the capacitor gradually charges through one or more resistors to relatively slowly raise the input bias voltage. The time constant provided by the RC feedback network is such that the preamplifier circuit is not turned on until after the expiration of the start-up time period.

This known turn-on delay arrangement has a major disadvantage in that the capacitor, due to its connection with the pick-up head, can discharge through the pick-up head as the preamplifier circuit is turned off. If this is permitted to occur, the capacitor discharge will cause a spurious noise signal to be magnetically recorded on the tape over the signal already recorded thereon. The result is severe distortion of the original signal. In order to avoid this distortion, one or more diodes or other circuit elements must be employed to discharge the capacitor through a path other than the pick-up head. Undesirably, these extra elements add to the complexity and cost of the preamplifier circuit and may not be compatible with the use of integrated circuit fabrication techniques.

The present invention contemplates a preamplifier circuit which provides the desired turn-on delay but which avoids the use of a capacitor connected with the pick-up head thereby eliminating the need for discharge diodes or other similar elements. Further, the preamplifier circuit of the invention provides relatively stable DC operation, employs a minimum number of components, and is suitable for manufacture in integrated circuit form.

According to one aspect of the invention, a voltage-follower transistor is operable when turned on to establish the output bias voltage of the preamplifier circuit at substantially a reference voltage which is developed coincident with energization of the tape transport mechanism.

In another aspect of the invention, a time delay arrangement keeps the voltage-follower transistor turned off during the start-up time period. Preferably, a resistor and a capacitor are responsive to establishment of the reference voltage to provide an RC time constant which is effective to prevent the voltage-follower transistor from turning on until after the expiration of the start-up time period.

In a further aspect of the invention, the time delay also serves to bypass most of the preamplifier output signal around the voltage-follower transistor thereby preventing this bypassed output signal from being negatively fed back through the transistor to cause a reduction in the signal gain of the preamplifier circuit.

In a still further aspect of the invention, a limiting resistor attenuates the preamplifier output signal not bypassed by the capacitor thereby minimizing the resulting reduction in the signal gain of the preamplifier circuit due to the negative feedback of this unbypassed output signal through the voltage-follower transistor.

These and other aspects and advantages of the invention may be best understood by reference to the following detained description of a preferred embodiment when taken in conjunction with the accompanying drawing.

Figure 1:
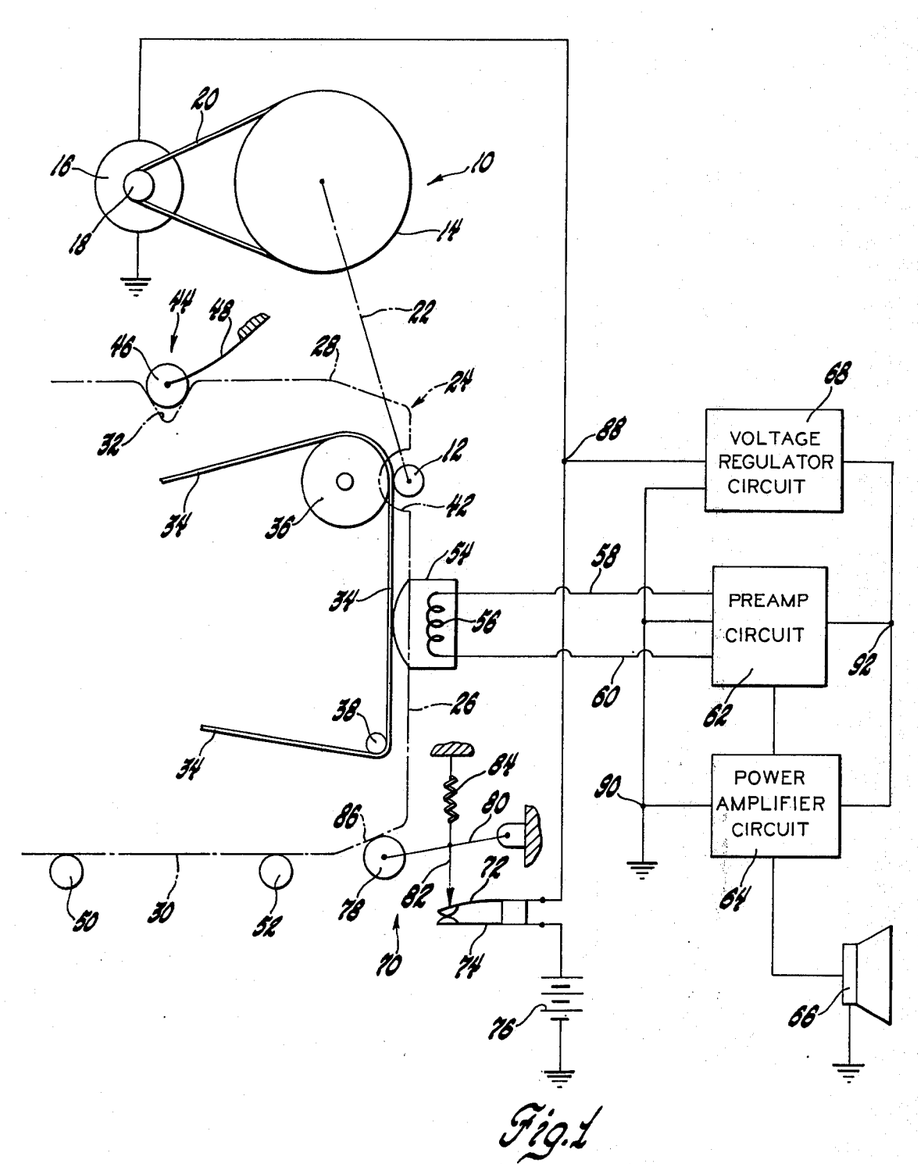
FIG. 1 is a block diagram of an audio playback system incorporating the invention.

Referring to FIG. 1, a magnetic tape player includes a tape transport mechanism 10 comprising a capstan 12, a flywheel 14, and an electric motor 16. The motor 16 includes an output shaft 18 which is indirectly coupled with the flywheel 14 via a belt 20 for rotatably driving the flywheel 14 when the motor 16 is energized. The flywheel 14 includes an output shaft 22 which is directly coupled to the capstan 12 for rotatably driving the capstan 12 when the flywheel 14 is in turn rotatably driven by the motor 16.

A tape cartridge 24, shown in outline form in FIG. 1, includes a front wall 26 and first and second sidewalls 28 and 30. For reasons which will become apparent later, the first sidewall 28 includes a V-shaped notch 32. The tape cartridge 24 contains an endless loop of magnetic tape 34 upon which a signal is magnetically recorded. Further, the tape cartridge 24 contains a pinch roller 36 and at least one tape guide 38 over which the tape 34 is disposed. The pinch roller 36 is rotatably mounted within the tape cartridge 24 which includes an opening 42 in the front wall 26 through which the tape 34 is exposed for frictional driving between the capstan 12 and the pinch roller 36.

A tape cartridge retaining mechanism 44 includes a roller 46 moounted to the free end of a leaf spring 48 located adjacent the first sidewall 28 of the tape cartridge 24. In addition, a pair of cartridge guides 50 and 52 are located adjacent the second sidewall 30 of the tape cartridge 24. As the tape cartridge 24 is initially inserted into the tape player a ramp 40 on the first sidewall 28 engages the roller 46 and cams it outwardly against the action of the spring arm 48. As the cartridge 24 is further moved toward the play position, as shown in FIG. 1, the roller 46 is biased by the spring arm 48 into engagement with the forward surface of the V-shaped notch 32 to simultaneously thrust the cartridge 24 sideward to engage the second sidewall 30 with the cartridge guides 50 and 52 and forward to frictionally engage the tape 34 between the capstan 12 and the pinch roller 36. With the tape cartridge 24 held in the play position by the cartridge retaining mechanism 44, the tape 34 is linearly driven between the capstan 12 and the pinch roller 36 when the tape transport mechanism 10 is energized.

The tape player also includes a pick-up head 54 which includes an electromagnetic winding 56. When the tape cartridge 24 is in the play position, the pick-up head 54 protrudes through an opening (not shown) in the front wall 26 so as to place the winding 56 in electromagnetic coupling relationship with the magnetic tape 34. In response to transport of the tape 34, the pick-up head 54 inductively develops a voltage across the winding 56. Provided that the tape 34 is transported at a prescribed speed, the voltage developed across the winding 56 is accurately related to the signal magnetically recorded on the tape 34. This signal voltage is fed via a pair of conductors 58 and 60 to a preamplifier circuit 62 which is part of an audio playback system that also includes a power amplifier circuit 64 and a loudspeaker 66. The signal voltage is amplified in the preamplifier circuit 62 and in the power amplifier circuit 64 from which it is applied to drive the loudspeaker 66. The audio playback system further includes a voltage regulator circuit 68 which will be more fully described later.

A switching mechanism 70 energizes the electric motor 16 of the tape transport mechanism 10 in response to movement of the tape cartridge 24 to the play position as shown in FIG. 1. Specifically, the switching mechanism 70 includes a pair of normally open leaf spring contacts 72 and 74. The motor 16 is connected between the contact 72 and ground. A power supply 76 is connected between the contact 74 and ground. The switching mechanism 70 also includes a roller 78 mounted to the free end of a pivotal arm 80 to which an actuator finger 82 is attached. A tension spring 84 normally pulls the pivotal arm 80 upward such that the actuator finger 82 is held out of engagement with the leaf spring contact 72. However, as the tape cartridge 24 is thrust into the play position, a ramp 86 on the second sidewall 30 engages the roller 78 to cam the pivotal arm 80 downward against the action of the tension spring 84. As the arm 80 moves downward, the actuator finger 82 deflects the contact 72 into engagement with the contact 74 to energize the motor 16 from the power supply 76.

Prior to closure of the contacts 72 and 74, the magnetic tape 34 is at a standstill within the tape cartridge 24. Due to the inertia of the flywheel 14 and the other elements of the tape transport mechanism 10, the speed of the tape 34 cannot change instantaneously as the contacts 72 and 74 are closed. As a result, following energization of the motor 76, the speed of the tape 34 only gradually rises and does not reach the prescribed speed until after the expiration of a start-up time period. Since the speed of the tape 34 is below the prescribed speed during the start-up time period, the voltage developed across the winding 56 of the pick-up head 54 is distortedly related to the signal magnetically recorded on the tape. Accordingly, it is desirable that the preamplifier circuit 62 remain turned off during the start-up time period. Or, stated another way, it is desirable that the preamplifier circuit 62 be prevented from producing an output signal until after the expiration of the start-up time period. The present invention provides a preamplifier circuit capable of providing this desired mode of operation.

Before proceeding to a detailed description of the preamplifier circuit 62 of the invention, a brief description of the voltage regulator circuit 68 will be given. However, it is to be understood that the voltage regulator circuit 68 does not form a part of the invention per se. It is presented here because it has been found convenient to provide the voltage regulator circuit 68 on the same integrated circuit chip as the inventive preamplifier circuit 62. Further, it is to be understood that the preamplifier circuit 62 of the invention is not limited to applications involving the magnetic tape player apparatus previously described, but rather, may be utilized with virtually any tape player apparatus exhibiting a start-up time period during which the recovered signal is distorted.

Figure 2:
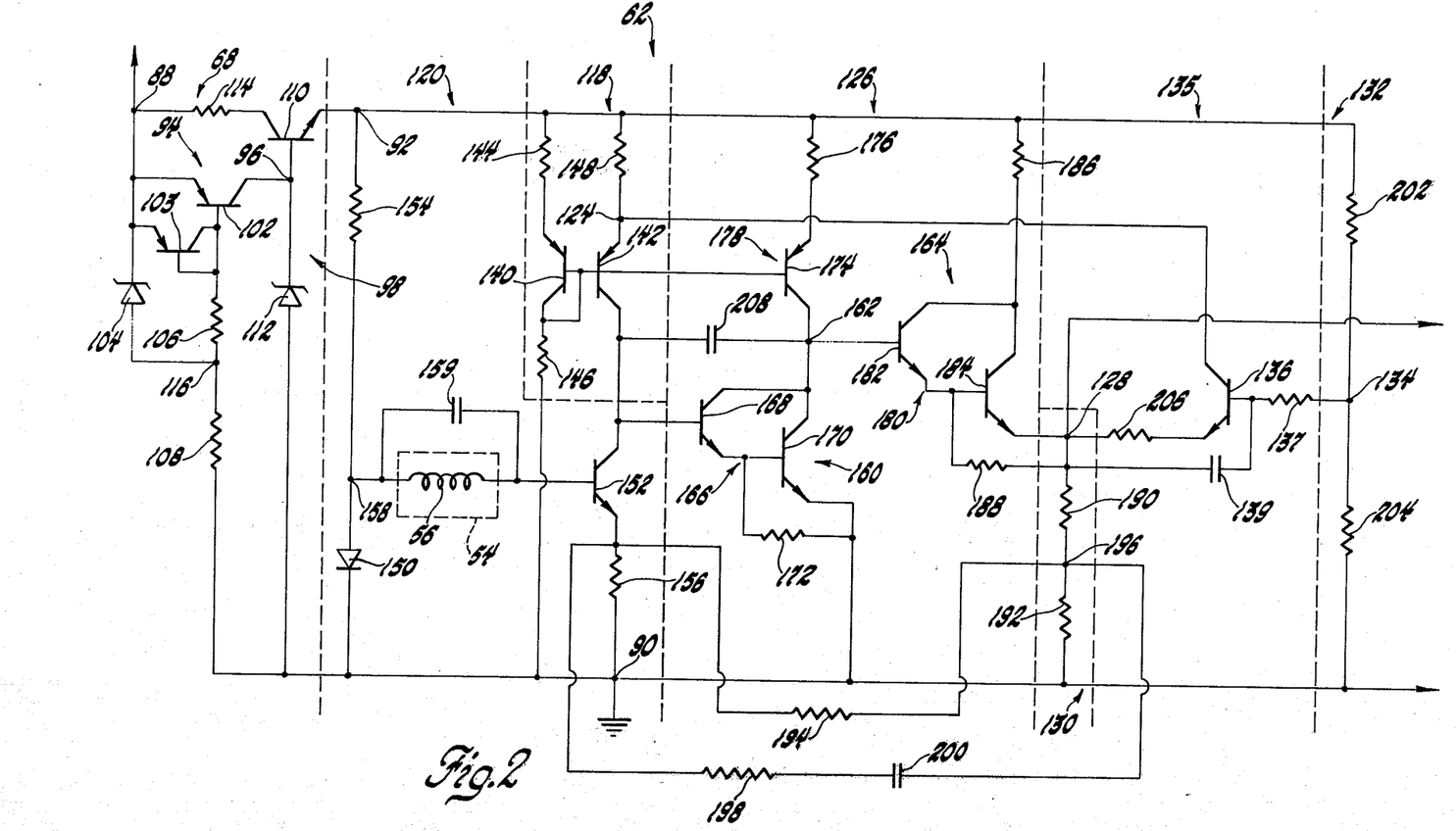
FIG. 2 is a schematic diagram of a preamplifier circuit incorporating the invention.

Referring to FIGS. 1 and 2, the voltage regulator circuit 68 is responsive to the application of an unregulated supply voltage between an input node 88 and a ground node 90 to develop a regulated supply voltage between an output or supply node 92 and the ground node 90. It includes a first stage 94 connected between the input node 88 and an intermediate node 96 and a second stage 98 connected between the intermediate node 96 and the output node 92. The first stage 94 features a pair of PNP transistors 102 and 103, a Zener diode 104, and a pair of biasing resistors 106 and 108. The second stage 98 features an NPN transistor 110, a Zener diode 112, and a load resistor 114. The base and collector electrodes of the transistor 103 are shorted together such that it operates as a conventional diode across its base-emitter junction. The transistor 110 is connected to operate as an emitter-follower.

As the contacts 72 and 74 of the switching mechanism 70 are closed to energize the tape transport mechanism 10, the unregulated supply voltage from the power source 76 is applied between the input node 88 and the ground node 90. In turn, the voltage regulator 68 produces a regulated supply voltage between the supply node 92 and the ground node 90. The voltage at the intermediate node 96 is regulated by the breakdown potential of the Zener diode 104 and by the breakdown potential of the Zener diode 112. The voltage at the output node 92 is defined below the voltage at the intermediate node 96 by an amount equal to the base-emitter junction voltage drop of the transistor 110. The primary function of the voltage regulator 68 is to provide power supply ripple rejection.

The mechanism by which the voltage at the intermediate node 96 is influenced by the Zener diode 104 is deserving of further description. Specifically, the current through the biasing resistor 106 is determined by the voltage drop across it. This voltage drop is equal to the voltage drop defined across the Zener diode 104 less the voltage drop defined across the parallel base-emitter junctions of the transistors 102 and 103. As a result, the current through the resistor 106 is held relatively constant by the Zener diode 104 regardless of variations in the unregulated supply voltage applied at the input node 88. Assuming that the current gain characteristics and the overall device geometries of the transistors 102 and 103 are substantially identical, constraints which are easily achieved through the use of integrated circuit fabrication techniques, the collector current of the transistor 102 is maintained proportional to and very nearly equal to the current through the resistor 106. The voltage at the intermediate node 96 is, in part, determined by the collector current of the transistor 102. In this manner, the Zener diode 104, which holds the collector current of the transistor 102 substantially constant, helps to regulate the voltage developed at the intermediate node 96. Of course, the voltage at the intermediate node 96 is also regulated by the voltage drop defined across the Zener diode 112.

The preamplifier circuit 62 includes first and second current generators 118 and 120. The first current generator 118 applies a first input bias current to an input node 122. The first current generator 118 includes a control node 124 through which the first input bias current is directed. The second current generator 120 draws a second input bias current from the input node 122. The second current generator 120 includes the winding 56 of the pick-up head 54 such that an input signal current corresponding to the voltage developed across the winding 56 is effectively impressed upon the first input bias current. Like the voltage across the winding 56, the input signal current is distorted during the start-up time period.

The preamplifier circuit 62 also includes an amplifier block 126 connected between the input node 122 and an output node 128. The amplifier block 126 is shiftable between an active state and an inactive or saturated state. In the active state, the amplifier block 126 applies an output bias current to the output node 128 which is an amplification of the difference between the first and second input bias currents. The first input bias current is greater than the second input bias current. Further, in the active state, the amplifier block 126 applies an output signal current to the output node 128 which is an amplification of the input signal current. Like the input signal current, the output signal is distorted during the start-up time period. The amplifier block 126 shifts to the active state only when the difference between the first and second input bias currents is less than a predetermined current differential. When the difference between the first and second input bias currents is greater than the predetermined current differential, the amplifier block 126 shifts to the inactive or saturated state in which no output bias current and no output signal current are produced.

A load 130 is connected within the preamplifier circuit 62 between the output node 128 and the ground node 90. The load 130 develops an output bias voltage at the output node 128 which corresponds to the output bias current applied to the output node 128. The load 130 also develops an output signal voltage at the output node 128 which corresponds to the output signal current applied to the output node 128. Like the output signal current, the output signal voltage is distorted during the start-up time period.

In addition, the preamplifier circuit 62 includes a voltage divider network 132 which combines with the voltage regulator circuit 68 and the switching mechanism 70 to provide a voltage generator for establishing a reference voltage at a reference node 134 substantially at the instant that the tape transport mechanism 10 is initially energized. The significance of this latter aspect will become more apparent later.

Lastly, the preamplifier circuit 62 includes a bias current controller 135 including a voltage-follower transistor 136 connected with the control node 124, the output node 128, and the reference node 134. The transistor 136 is operable when turned on to develop a bias control current between the control node 124 and the output node 128. The bias control current is algebraically summed with the first input bias current at the control node 124 to so alter the first input bias current that the difference between the first and second input bias currents at the input node 122 is made less than the predetermined current differential thereby shifting the amplifier block 126 to the active state. As the amplifier block 126 shifts to the active state, it applies an output bias current to the output node 128 which increases until the output bias voltage developed at the output node 128 by the load 130 is raised to substantially the reference voltage established at the reference node 134 by the voltage divider network 132. In this manner, the output bias voltage established at the node 128 is very stably pegged to the reference voltage established at the node 134.

Further the bias current controller 135 includes a time delay arrangement formed by a resistor 137 and a capacitor 139 which combine to provide an RC time constant that is effective to prevent the voltage-follower transistor 136 from turning on until after the expiration of the start-up time period of the tape transport mechanism 10. As a result, the production of a distorted output voltage signal by the preamplifier circuit 62 is avoided during the start-up time period. The bias current controller 135 will be described in much greater detail later, but first, a more detailed description of the other portions of the preamplifier circuit 62 is in order.

The first current generator 118 features a pair of PNP transistors 140 and 142. A reference branch is provided by the transistor 140, a biasing resistor 144 and a limiting resistor 146. An output branch is provided by the transistor 142 and a biasing resistor 148. The biasing resistor 144 is connected between the supply node 92 and the emitter of the transistor 140. The limiting resistor 146 is connected between the collector of the transistor 140 and the ground node 90. The biasing resistor 148 is connected between the supply node 92 and the emitter of the transistor 142.

The base and collector of the transistor 140 are shorted together so that it operates as a conventional diode across its base-emitter junction. Further, the base of the transistor 140 and the base of the transistor 142 are shorted together such that the voltage drop between the supply node 92 and the base of each of the transistors 140 and 142 is identical. Still further, the base-emitter junction area of the transistor 140 is made the same size as the base-emitter junction area of the transistor 142, a constraint which is easily achieved using integrated circuit fabrication techniques. Under these conditions, the current flowing through the emitter of the transistor 142 is approximately equal to the current flowing through the emitter of the transistor 140 multiplied by the ratio of the resistance value of the resistor 144 to the resistance value of the resistor 148. In turn, the emitter current of the transistor 140 is determined by the resistance value of the resistor 146.

The first input bias current applied to the input node 122 is equal to the collector current of the transistor 142. Neglecting the negligible base current of the transistor 142, its collector current is equal to its emitter current which flows through the control node 124. Accordingly, the first input bias current applied to the input node 122 also flows through the control node 124. Further, the magnitude of the first input bias current is defined in relation to the ratio of the resistance value of the resistor 144 to the resistance value of the resistor 148.

The second current generator 120 features a diode 150 and an NPN transistor 152. A reference branch is provided by the diode 140 and a limiting resistor 154. An output branch is provided by the transistor 152 and a biasing resistor 156. The resistor 154 is connected between the supply node 92 and a bias node 158. The anode of the diode 150 is connected to the bias node 158 while the cathode of the diode 150 is connected to the ground node 90. The resistor 156 is connected between the emitter of the transistor 152 and the ground node 90. The winding 56 of the pick-up head 54 is connected between the bias node 158 and the base of the transistor 152. A capacitor 159 is connected across the winding 56 for reasons which will be more fully explained later.

The second input bias current drawn out of the input node 122 is less than the first input bias current. This second input bias current is equal to the collector current of the transistor 152. Neglecting its negligible base current, the collector current of the transistor 152 is equal to its emitter current. The emitter current of the transistor 152 is approximately equal to the anode current of the diode 150 multiplied by the ratio of the base-emitter junction area of the transistor 152 to the anode-cathode junction area of the diode 150. The anode current of the diode 150 is determined by the resistance value of the resistor 154. The ratio between the base-emitter junction area of the transistor 152 and the anode-cathode junction area of the diode 150 is easily controlled using integrated circuit fabrication techniques. However, it is to be noted that, due to the effect of the resistor 156, the ratio of the emitter current of the transistor 152 to the anode current of the diode 150 is actually somewhat lower than the ratio of the base-emitter junction area of the transistor 152 to the anode-cathode junction area of the diode 150.

In addition, an input signal current is drawn out of the input node 122. This input signal current is related to the voltage developed across the winding 56 of the pick-up head 54. Specifically, the voltage across the winding 56 causes a corresponding current to flow therethrough. This current is amplified in accordance with the collector-to-base current gain or beta of the transistor 152 to form the input signal current. Hence, the input signal current, which is a phase inverted amplification of the current in the winding 56, is effectively impressed upon the second input bias current withdrawn from the input node 122. Like the voltage developed across the winding 56, the input signal current is distorted during the start-up period. In passing, it should be noted that, since the load impedance of the transistor 152 is significantly greater than its source impedance, the transistor 152 not only provides signal current amplification, it also provides signal voltage amplification.

The amplifier block 126 includes a first stage 160 connected between the input node 122 and an interstage node 162, and a second stage 164 connected between the interstage node 162 and the output node 128. The first stage 160 includes a composite Darlington transistor 166 formed by two NPN transistors 168 and 170. The base of the transistor 168 is connected to the input node 122. The emitter of the transistor 170 is connected to the ground node 90. The collector of each of the transistors 168 and 170 is connected to the interstage node 162. A bleeder resistor 172 is connected from the junction between the emitter of the transistor 168 and the base of the transistor 170 to the ground node 90. The bleeder resistor 172 sets the bias current of the transistor 168 and makes it relatively independent of variations in the individual current gains of the transistors 168 and 170.

The first stage 160 also includes a PNP transistor 174 and a biasing resistor 176 which combine to provide the output branch of a third current generator 178 for which the transistor 140 and the resistors 144 and 146 combine to provide the reference branch. In the same manner previously described with respect to the development of the first input bias current applied to the input node 12 by the first current generator 118, the third current generator 178 develops a first interstage bias current which is applied to the interstage node 162.

The composite transistor 166 draws a second interstage bias current out of the interstage node 162. The second interstage bias current is an amplification of the difference between the first and second input bias currents at the input node 122. Further, the composite transistor 166 also draws an interstage signal current out of the node 162 which is a phase inverted amplification of the input signal current drawn out of the input node 122. The interstage signal current is effectively impressed upon the second interstage bias current at the node 162. Moreover, like the transistor 152, the composite transistor 166 provides substantial signal voltage amplification.

The second stage 164 of the amplifier block 126 includes a composite Darlington transistor 180 formed by two NPN transistors 182 and 184. The base of the transistor 182 is connected directly to the interstage node 162. The emitter of the transistor 184 is connected directly to the output node 128. A limiting resistor 186 is connected from the supply node 92 to the common junction of the collector of each of the transistors 182 and 184. A bleeder resistor 188 is connected from the junction between the emitter electrode of the transistor 182 and the base electrode of the transistor 184 to the output node 128. The bleeder resistor 188 sets the bias current of the transistor 182 and makes it relatively independent of variations in the individual current gains of the transistors 182 and 184.

The composite transistor 180 applies an output bias current to the output node 128 which is an amplification of the difference between the first and second interstage bias currents at the node 162. Since the fist interstage bias current is constant and the second interstage bias current is an amplification of the difference between the first and second input bias currents at the input node 122, the output bias current at the node 128 is an amplification of the difference between the first and second input bias currents at the node 122.

In addition, the composite transistor 180 also applies an output signal current to the output node 128 which is an amplification of the interstage signal current at the interstage node 162. Since the interstage signal current at the node 162 is a phase inverted amplification of the input signal current at the input node 122, which in turn, is a phase inverted amplification of the current developed through the winding 56 of the pick-up head 54, the output signal current at the node 128 is an amplification of the current developed through the winding 56. At the output node 128, the output signal current is effectively impressed upon the output bias current, and like the current in the winding 56, it is distorted during the start-up time period.

The load 130 includes the series combination of a relatively large load resistor 190 and a relatively small feedback resistor 192 connected in series between the output node 128 and the ground node 90. As previously described, the series combination of the resistors 190 and 192 develops an output bias voltage thereacross at the output node 128 which corresponds to the output bias current applied to the output node 128. Similarly, the resistors 190 and 192 develop an output signal voltage thereacross at the output node 128 which corresponds to the output signal current applied to the output node 128.

A first negative feedback path is provided by a first feedback resistor 194 connected from a feedback node 196 located between the load resistor 190 and the feedback resistor 192 to the emitter of the transistor 152. An increase in the current flowing through the resistors 190 and 192 results in a corresponding increase in the current fed back from the node 116 through the resistor 194 to the emitter of the transistor 152 thereby lowering its conduction. As the transistor 152 conducts less, the current drawn out of the input node 122 is reduced thereby causing a corresponding decrease in the current flowing through the resistors 190 and 192, and so on. The action of the resistor 194 is the same as to both the output bias current and the output signal current. In this manner, the resistor 194 serves to set the overall DC and AC gain of the preamplifier circuit 62. Of course, the action of the resistor 194 in response to a decrease in the current flow through the resistor 190 and 192 is exactly opposite to that just described.

A second negative feedback path is provided by a second feedback resistor 198 and a feedback capacitor 200 connected in series between the feedback node 196 and the emitter of the transistor 152. Acting in a manner similar to the feedback resistor 194, the resistor 198 and the capacitor 200 combine to feed back a variable portion of the output signal current only. Further, due to the reactane of the capacitor 200, the portion of the output signal current returned to the emitter of the transistor 152 increses as the signal frequency increases. Thus, at the higher signal frequencies, the AC or signal gain of the preamplifier circuit 62 is defined as an inverse function of the frequency of the output signal current thereby causing a roll-off in the frequency response. This decrease in the high frequency response of the preamplifier circuit 62 helps to compensate for the increase in the high frequency response caused by the winding 56 of the pick-up head 54 and for any high frequency preemphasis of the signal as recorded on the tape.

The voltage divider network 132 includes a pair of resistors 202 and 204. The resistor 202 is connected between the supply node 92 and the reference node 134. The resistor 204 is connected between the reference node 134 and the ground node 90. At the instant that the tape transport mechanism 10 is energized in response to closure of the switching contacts 72 and 74, the voltage regulator 68 is likewise energized to develop a regulated supply voltage between the supply node 92 and the ground node 90. At that instant, the resistors 202 and 204 act to divide the regulated supply voltage in accordance with their respective resistance values to establish the reference voltage at the node 134.

The current controller 135 includes the NPN transistor 136 connected in a voltage-follower or emitter-follower configuration. The collector of the transistor 136 is directly connected to the control node 124. The emitter of the transistor 136 is indirectly connected to the output node 128 through a limiting resistor 206. The base of the transistor 136 is indirectly connected to the reference node 134 through the time delay resistor 137. The time delay capacitor 139 is connected between the base of the transistor 136 and the output node 128.

When turned on, the transistor 136 establishes a bias control current from the control node 124 to the output node 128. The bias control current subtracts from the first input bias current at the control node 124 to so reduce the first input bias current that the difference between the first and second input bias currents at the input node 122 is made less than the predetermined current differential thereby shifting the amplifier block 126 to the active state. As the amplifier block 126 shifts to the active state, it applies an output bias current to the output node 128 which increases until the output bias voltage developed at the output node 128 by the resistors 190 and 192 is raised to within a predetermined voltage differential of the reference voltage established at the reference node 134 by the resistors 202 and 204. This predetermined voltage differential, which is defined by the summation of the voltage drops across the resistor 206 and the base-emitter junction of the transistor 136 and the resistor 137, is so small in relation to the magnitude of the reference voltage that the output bias voltage established at the output node 128 is substantially equal to the reference voltage defined at the reference node 134. Moreover, because the emitter-follower transistor acts as a relatively high gain DC feedback device, the output bias voltage remains stubbornly pegged to the reference voltage in spite of any variations in the characteristics of the circuit components with time or temperature. The bias control current also adds to the output bias current at the output node 128, but it is so small in relation to the output bias current that it does not significantly alter the output bias current.

The resistor 137 and the capacitor 139 combine to form an RC time delay network which prevents the transistor 136 from turning on subsequent to energization of the tape transport mechanism 10 until after the start-up time period has expired. In particular, immediately following establishment of the reference voltage at the reference node 134, which occurs coincident with energization of the tape transport mechanism 10, the capacitor 139 begins charging through the resistor 137 to increase the voltage defined between the base of the transistor 136 and the output node 128 in accordance with the RC time constant provided by the resistor 137 and the capacitor 139. This RC time constant is selected such that the voltage defined across the capacitor 139 is insufficient to turn on the transistor 136 until after the expiration of the start-up time period of the tape transport mechanism 10. As a result, the output bias voltage (and the output signal voltage) are not established at the output node 128 until transport of the magnetic tape 34 has reached the prescribed speed. In this manner, the preamplifier circuit 62 is prohibited from prematurely producing a distorted output signal during the start-up time period.

The capacitor 139 also serves to bypass a major portion of the output signal current around the base-emitter junction of the transistor 136 to prevent the negative feedback of this portion of the output signal current. If the capacitor 139 was not connected to the output node 128 (but was rather connected to the ground node 90 for example) the transistor 136 would effectively impress an appreciable portion of the output signal current upon the bias control current and, in turn, upon the first input bias current applied to the input node 122. This feedback signal current would tend to cancel the input signal current at the input node 122 thereby lowering the signal gain of preamplifier circuit 62. To a large degree, the capacitor 139 prevents this undesirable effect from taking place.

However, the capacitor 139 is not effective to bypass all of the output signal current around the transistor 136. Due to the reactance of the capacitor 139, the portion of the output signal current not bypassed by the capacitor 139 is inversely related to the signal frequency. Hence, the lower the frequency of the output signal current, the greater the portion that is not bypassed through the capacitor 139. The resistor 206 acts to attenuate the unbypassed portion of the output signal current thereby minimizing the reduction in the signal gain of the preamplifier circuit 62 due to the unwanted negative feedback of this portion of the output signal current.

The inherent time lag between the occurrence of a given current or voltage change at the output node 128 and the occurrence of a compensating change at the input node 122 is such as to create an artificial phase shift which can cause the preamplifier circuit 62 to oscillate under some conditions. In order to prevent such oscillation, a capacitor 208 is connected between the input node 122 and the interstage node 162 for providing a local signal feedback around the first stage 160 of the amplifier block 126 thereby providing a compensating phase shift to help stabilize the preamplifier circuit 62. The capacitor 159, connected across the winding 56, serves a similar stabilizing function by introducing a phase shift which counteracts the phase shift introduced by the winding 56.

It will now be appreciated that the foregoing embodiment of the invention is shown and described for demonstrative purposes only and that various modifications and alterations may be made to it without departing from the spirit and scope of the invention as defined by the appended claims.

In the claims, where one element is recited as "connected to" another element, the term "connected to" is intended to encompass indirect connection through intervening elements as well as direct connection exclusive of any intervening elements.

What is claimed is:

1. In a tape player including a pick-up head responsive to transport of a tape at a prescribed speed to develop a voltage which is accurately related to a signal recorded on the tape, and further including a tape transport mechanism which transports the tape at the prescribed speed when energized but which exhibits an inertia such that following energization of the tape transport mechanism the tape does not reach the prescribed speed until after the expiration of a start-up time period during which the voltage developed by the pick-up head is distortedly related to the signal recorded on the tape; a preamplifier circuit comprising: an input node; a first current generator for generating a first input bias current which is one of applied or withdrawn at the input node, the first current generator including a control node through which the first input bias current is directed; a second current generator for generating a second input bias current which is the other of applied or withdrawn at the input node, the second current generator including the pick-up head for effectively impressing upon the second input bias current an input signal current which corresponds to the voltage developed by the pick-up head such that the input signal current is distorted during the start-up time period; an output node; an amplifier block shiftable between an active state and an inactive state, the amplifier block operating in the active state to apply an output bias current to the output node which is an amplification of the difference between the first and second input bias currents and also operating in the active state to apply an output signal current to the output node which is an amplification of the input signal current such that the output signal current is distorted during the start-up time period, the amplifier block shifting to the active state only when the difference between the first and second input bias currents is one of greater or less than a predetermined current differential and shifting to the inactive state in which no output bias current and no output signal current are developed when the difference between the first and second input bias currents is the other of greater or less than the predetermined current differential; a load for developing an output bias voltage at the output node which corresponds to the output bias current and for developing an output signal voltage at the output node which corresponds to the output signal current such that the output signal voltage is distorted during the start-up time period; a voltage generator including a reference node at which a reference voltage is established when the tape transport mechanism is energized; and a bias current controller including a voltage-follower transistor operable when turned on to develop a bias control current between the output node and the control node at which it is algebraically summed with the first input bias current such that the difference between the first and second input bias currents at the input node is made the one of greater or less than the predetermined current differential thereby shifting the amplifier block to the active state to develop an output bias current at the output node which increases until the output signal voltage developed at the output node is raised to substantially the reference voltage established at the reference node; the bias current controller further including time delay means for preventing the voltage-follower transistor from turning on until after the expiration of the start-up time period of the tape transport mechanism thereby to avoid the production of a distorted output signal voltage at the output node.

2. In a tape player including a pick-up head responsive to transport of a tape at a prescribed speed to develop a voltage which is accurately related to a signal recorded on the tape, and further including a tape transport mechanism which transports the tape at the prescribed speed when energized but which exhibits an inertia such that following energization of the tape transport mechanism the tape does not reach the prescribed speed until after the expiration of a start-up time period during which the voltage developed by the pick-up head is distortedly related to the signal recorded on the tape; a preamplifier circuit comprising: an input node; a first current generator connected to the input node for generating a first input bias current which is one of applied or withdrawn at the input node, the first current generator including a control node through which the first input bias current is directed; a second current generator connected to the input node for generating a second input bias current which is the other of applied or withdrawn at the input node, the second current generator including a pick-up head for effectively impressing upon the second input bias current an input signal current which corresponds to the voltage developed by the pick-up head such that the input signal current is distorted during the start-up time period; an output node; an amplifier block connected between the input node and the output node and shiftable between an active state and an inactive state, the amplifier block operating in the active state to apply an output bias current to the output node which is an amplification of the difference between the first and second input bias currents and also operating in the active state to apply an output signal current to the output node which is an amplification of the input signal current such that the output signal current is distorted during the start-up time period, the amplifier block shifting to the active state only when the difference between the first and second input bias currents is one of greater or less than a predetermined current differential and shifting to the inactive state in which no output bias current and no output signal current are developed when the difference between the first and second input bias currents is the other of greater or less than the predetermined current differential; a load connected to the output node for developing an output bias voltage at the output node which corresponds to the output bias current and for developing an output signal voltage at the output node whch corresponds to the output signal current such that the output signal voltage is distorted during the start-up time period; a voltage generator including a reference node at which a reference voltage is established when the tape transport mechanism is energized; and a bias current controller including an emitter-follower transistor having a collector electrode connected to the control node and an emitter electrode connected to the output node and a base electrode connected to the reference node, the emitter-follower transistor operable when turned on to develop a bias control current between the output node and the control node, the bias control current algebraically summing with the first input bias current at the control node to so alter the first input bias current that the difference between the first and second input bias currents at the input node is made the one of greater or less than the predetermined current differential thereby shifting the amplifier block to the active state to develop an output bias current at the output node which increases until the output bias voltage developed at the output node is raised to within a predetermined voltage differential of the reference voltage established at the reference node; the bias current controller further including a time delay resistor connected between the base electrode of the emitter-follower transistor and the reference node and a time delay capacitor connected between the base electrode of the emitter-follower transistor and the output node, the resistor and capacitor combining to provide an RC time constant for delaying the turn on of the emitter-follower transistor until after the expiration of the start-up time period of the tape transport mechanism thereby to avoid the production of a distorted output signal voltage at the output node, the time delay capacitor also serving to externally bypass most of the output signal current between the base and emitter electrodes of the emitter-follower transistor to prevent such bypassed signal current from being effectively impressed upon the bias control current and in turn upon the first input bias current thereby causing it to be negatively fed back to the input node resulting in a reduction in the signal gain of the preamplifier circuit.

3. In a magnetic tape player including a pick-up head responsive to transport of a tape at a prescribed speed to electromagnetically develop a voltage which is accurately related to a signal magnetically recorded on the tape, and further including a tape transport mechanism which transports the tape at the prescribed speed when energized but which exhibits an inertia such that following energization of the tape transport mechanism the tape does not reach the prescribed speed until after the expiration of a start-up time period during which the voltage developed by the pick-up head is distortedly related to the signal magnetically recorded on the tape; a preamplifier circuit comprising: an input node; a first current generator connected to the input node for generating a first input bias current which is one of applied or withdrawn at the input node, the first current generator including a control node through which the first input bias current is directed; a second current generator connected to the input node for generating a second input bias current which is the other of applied or withdrawn at the input node, the second current generator including the pick-up head for effectively impressing upon the second input bias current an input signal current which corresponds to the voltage developed by the pick-up head such that the input signal current is distorted during the start-up time period; an output node; an amplifier block connected between the input node and the output node and shiftable between an active state and an inactive state, the amplifier block operating in the active state to apply an output bias current to the output node which is an amplification of the difference between the first and second input bias currents and also operating in the active state to apply an output signal current to the output node which is an amplification of the input signal current such that the output signal current is distorted during the start-up time period, the amplifier block shifting to the active state only when the difference between the first and second input bias currents is one of greater or less than a predetermined current differential and shifting to the inactive state in which no output bias current and no output signal current are developed when the difference between the first and second input bias currents is the other of greater or less than the predetermined current differential; a load connected to the output node for developing an output bias voltage at the output node which corresponds to the output bias current and for developing an output signal voltage at the output node which corresponds to the output signal current such that the output signal voltage is distorted during the start-up time period; a voltage generator including a reference node at which a reference voltage is established when the tape transport mechanism is energized; and a bias current controller including an emitter-follower transistor having a collector electrode connected to the input node and an emitter electrode connected to the output node and a base electrode connected to the reference node, the emitter-follower transistor operable when turned on to develop a bias control current which is one of applied or withdrawn at the output node and which is the other of applied or withdrawn at the control node, the bias control current algebraically summing with the first input bias current at the control node to so alter the first input bias current that the difference between the first and second input bias currents at the input node is made the one of greater or less than the predetermined current differential thereby shifting the amplifier block to the active state to develop an output bias current at the output node which increases until the output bias voltage developed at the output node is raised to within a predetermined voltage differential of the reference voltage at the reference node, the bias control current also algebraically summed with the output bias current at the output node but being so small in relation to the output bias current that it does not significantly alter the output bias current; the bias current controller further including a time delay resistor connected between the base electrode of the emitter-follower transistor and the reference node and a time delay capacitor connected between the base electrode of the emitter-follower transistor and the output node, the resistor and capacitor combining to provide an RC time constant for delaying the turn on of the emitter-follower transistor until after the expiration of the start-up time period of the tape transport mechanism thereby to prevent the production of a distorted output signal voltage at the output node, the time delay capacitor also serving to externally bypass most of the output signal current between the base and emitter electrodes of the emitter-follower transistor to prevent such bypassed signal current from being effectively impressed upon the bias control current and in turn upon the first input bias current thereby causing it to be negatively fed back to the input node resulting in a reduction in the signal gain of the preamplifier circuit; the bias current controller also including a limiting resistor connected between the emitter electrode of the emitter follower transistor and the output node for attenuating the output signal current not bypassed by the time delay capacitor but instead negatively fed back to the input node thereby to minimize the resulting reduction in the signal gain of the preamplifier circuit.

* * * * *